United States Patent Office 3,737,452
Patented June 5, 1973

3,737,452
LOWER ALKYL 5-METHYLHEXO-3,4-DIENOATES AND PREPARATION THEREOF
Hugo Jorge Monteiro, Mountain View, and John B. Siddall, Palo Alto, Calif., assignors to Zoecon Corporation, Palo Alto, Calif.
No Drawing. Filed Jan. 12, 1971, Ser. No. 105,971
Int. Cl. C07c 69/54
U.S. Cl. 260—486 R                                    11 Claims

ABSTRACT OF THE DISCLOSURE

Preparation of lower alkyl 5-methylhexa-3,4-dienoates by the reaction of 3-methyl-1-butyn-3-ol and orthoester which is converted into lower alkyl 5-methylexa-2,4-dienoate, an intermediate for alkyl chrysanthemates.

This invention relates to a novel preparation of allenic esters, namely lower alkyl 5-methylhexa-3,4-dienoate, and the conversion thereof to lower alkyl 5-methylhexa-2,4-dienoate which is useful intermediate for the preparation of alkyl chrysanthemates as described by, for example, Fieser and Fieser "Reagents for Organic Synthesis" vol. 2, Wiley-Interscience, N.Y. p. 181 (1969).

The process of the present invention involves an orthoester Claisen type rearrangement which comprises the reaction of 3-methyl-1-butyn-3-ol with an orthoester I to yield the allenic ester II (R is primary or secondary lower alkyl of one to six carbon atoms).

$$(RO)_3-C-CH_3 \qquad \underset{CH_3}{\overset{CH_3}{\diagdown}}C=C=CH-CH_2-\overset{O}{\overset{\|}{C}}-OR$$
$$\text{(I)} \qquad\qquad \text{(II)}$$

The reaction is conducted at a temperature of from about room temperature to about 200° C., generally about 90° C. to the reflux temperature of the reaction mixture. The presence of a catalytic amount of a weak acid catalyst in carrying out the reaction is preferred although not essential. Conventional weak acid catalysts can be used and preferably a hindered acid catalyst to minimize esterification. Typical weak acid catalysts which are suitable include carboxylic acids such as propionic acid, acetic acid, pivalic acid, mesitoic acid, phenols such as mono- or di-nitrophenol, chlorinated phenols, inorganic acids such as phosphoric acid, ammonium nitrate and the like. The reaction can be carried out in the absence or presence of an organic solvent. Any organic solvent which is inert to the reaction and has a sufficiently high boiling point for the reaction temperature can be employed. Typical solvents include aromatic and aliphatic hydrocarbons, chlorinated hydrocarbons and ethers such as toluene, xylene, monoglyme, diglyme and dioxane. The reaction time will vary according to such factors as the reaction temperature. Completion of the reaction can be followed by the formation of the theoretical amount of the alcohol formed. One convenient technique is to conduct the reaction under a fractionation column collecting the alcohol as it evolves. When the theoretical equivalent of alcohol is collected, the reaction is complete.

The novel allenic ester II is then rearranged to yield the corresponding lower alkyl 5-methylhexa-2,4-dienoate. The arrangement of the allenic ester is accomplished by treatment with base, preferably mild alkaline conditions. Suitable bases include the alkali metal hydroxides, bicarbonates or carbonates and the alkaline earth metal hydroxides, bicarbonates or carbonates and organic bases such as alkali alkoxides. For example, sodium hydroxide, sodium bicarbonate, potassium carbonate, sodium ethoxide, calcium carbonate, and the like. The rearrangement is carried out in an organic solvent. The particular organic solvent employed is not critical, but generally a lower monohydric alcohol such as methanol, ethanol or propanol is used. The rearrangement is generally conducted at room temperature, although, higher and lower temperatures can be used. The rearrangement can be accomplished in the same pot as used for formation of the allenic ester, without isolation, if desired.

The following example illustrates the practice of the present invention.

EXAMPLE

A mixture of 81 g. of triethylorthoacetate, 8.4 g. of 3-methyl-1-butyn-3-ol and 0.76 g. of propionic acid was refluxed with a spinning band column to remove ethanol as it formed. After the elimination of ethanol was about complete, the pot residue was distilled under vacuum to yield ethyl 5-methylhexa-3,4-dienoate, B.P. 80–84° C. (17 mm.).

A solution of 0.5 g. of the above allenic ester in 5 ml. of ethanol was treated with one ml. of aqueous 2 N sodium hydroxide and left at room temperature for about 5 minutes. The mixture was poured into 40 ml. of pentane and washed with saturated brine and separated. Evaporation of pentane yielded ethyl 5-methylhexa-2,4-dienoate, B.P. 140–148° C. (95 mm.).

The use of 2,4-dinitrophenol in the foregoing process in place of propionic acid similarly afforded the allenic ester.

What is claimed is:
1. Compounds of the formula:

$$\underset{CH_3}{\overset{CH_3}{\diagdown}}C=C=CH-CH_2-\overset{O}{\overset{\|}{C}}-OR$$

wherein R is primary or secondary lower alkyl of one to six carbon atoms.

2. Compound according to claim 1 wherein R is methyl or ethyl.
3. Compound according to claim 1 wherein R is ethyl.
4. A process for the preparation of a lower alkyl 5-methylhexa-2,4-dienoate which comprises the steps of:
   (a) the reaction of an orthoester of the formula $$(RO)_3-C-CH_3$$

with 3-methyl-1-butyn-3-ol to produce an allenic ester of the formula $$\underset{CH_3}{\overset{CH_3}{\diagdown}}C=C=CH-CH_2-\overset{O}{\overset{\|}{C}}-OR$$

and
   (b) rearrangement of said allenic ester to produce said lower alkyl 5-methylhexa-2,4-dienoate, R is a primary or secondary lower alkyl of one to six carbon atoms.

5. The process according to claim 4 wherein in step (a) said reaction is conducted in the presence of a weak acid catalyst and R is methyl or ethyl.
6. The process according to claim 5 wherein said rearrangement is accomplished by treatment of the allenic ester with base.
7. The process according to claim 4 wherein in step (a) said reaction is conducted at about 60° C. to the reflux temperature of the reaction mixture and R is methyl or ethyl.
8. The process according to claim 7 wherein said rearrangement of the allenic ester is accomplished by treatment with base and the reaction of step (a) is conducted in the presence of a weak acid catalyst.

9. The process according to claim 8 wherein said rearrangement is accomplished using mild alkaline conditions.

10. The process according to claim 8 wherein said recation is conducted at about the reflux temperature of the reaction mixture.

11. The process according to claim 10 wherein R is ethyl.

References Cited

Crandall, J. K. and Tindell G. L., Chem. Communications 1411–1412 (1970).

Crowley, K., Jacs vol. 85, p. 1210, 1963.

LORRAINE A. WEINBERGER, Primary Examiner

P. J. KILLOS, Assistant Examiner